(12) United States Patent
Liess

(10) Patent No.: US 8,587,201 B2
(45) Date of Patent: Nov. 19, 2013

(54) EMERGENCY POWER SUPPLY CIRCUIT FOR DIMMABLE ELECTRONIC BALLASTS AND RELATED METHOD

(75) Inventor: Uwe Liess, Treviso (IT)

(73) Assignee: OSRAM Gesellschaft mit beschraenkter Haftung, Munich (DE)

(*) Notice: Subject to any disclaimer, the term of this patent is extended or adjusted under 35 U.S.C. 154(b) by 269 days.

(21) Appl. No.: 13/120,657

(22) PCT Filed: Oct. 17, 2008

(86) PCT No.: PCT/IB2008/002824
§ 371 (c)(1),
(2), (4) Date: Mar. 24, 2011

(87) PCT Pub. No.: WO2010/043923
PCT Pub. Date: Apr. 22, 2010

(65) Prior Publication Data
US 2011/0181206 A1     Jul. 28, 2011

(51) Int. Cl.
*H05B 37/00*  (2006.01)

(52) U.S. Cl.
USPC ............................. 315/86; 315/87; 315/131

(58) Field of Classification Search
USPC ....... 315/209 R, 86, 87, 307, 291, 297, 200 R
See application file for complete search history.

(56) References Cited

U.S. PATENT DOCUMENTS

| | | | | |
|---|---|---|---|---|
| 4,454,452 A | * | 6/1984 | Feldstein | 315/86 |
| 4,977,351 A | * | 12/1990 | Bavaro et al. | 315/87 |
| 5,214,352 A | * | 5/1993 | Love | 315/86 |
| 5,734,230 A | * | 3/1998 | Edwards et al. | 315/86 |
| 6,339,296 B1 | * | 1/2002 | Goral | 315/86 |
| 6,717,367 B2 | * | 4/2004 | Tabell | 315/86 |
| 7,045,964 B1 | * | 5/2006 | Hermans | 315/86 |
| 7,999,484 B2 | | 8/2011 | Jurngwirth et al. | |
| 2002/0140373 A1 | | 10/2002 | Ribarich et al. | |

FOREIGN PATENT DOCUMENTS

| | | |
|---|---|---|
| DE | 20219737 U1 | 4/2003 |
| DE | 20205234 U1 | 9/2003 |
| EP | 1128711 A2 | 8/2001 |
| EP | 1274286 A1 | 8/2003 |

(Continued)

OTHER PUBLICATIONS

International Search Report of PCT/IB2008/002824 dated Aug. 11, 2009.

(Continued)

*Primary Examiner* — Vibol Tan

(57) ABSTRACT

An emergency supply circuit for an electronic ballast may include: an output line to feed a supply input of the ballast; a first line to receive a mains supply signal; a second line to receive an emergency supply signal from a battery, with a converter interposed in said second line to boost said supply signal, a switch to alternatively connect said output line to said first or said second line; a controller sensitive to the absence of said mains supply signal and to the charge level of said battery, said controller to produce switching of said switch to connect said output line to said second line in the absence of said mains supply signal on said first line, whereby said output line receives said supply signal, and dimming interface circuitry to drive said dimming control input of said ballast when said output line is connected to said second feed line.

16 Claims, 2 Drawing Sheets

(56) References Cited

FOREIGN PATENT DOCUMENTS

Figure 1:
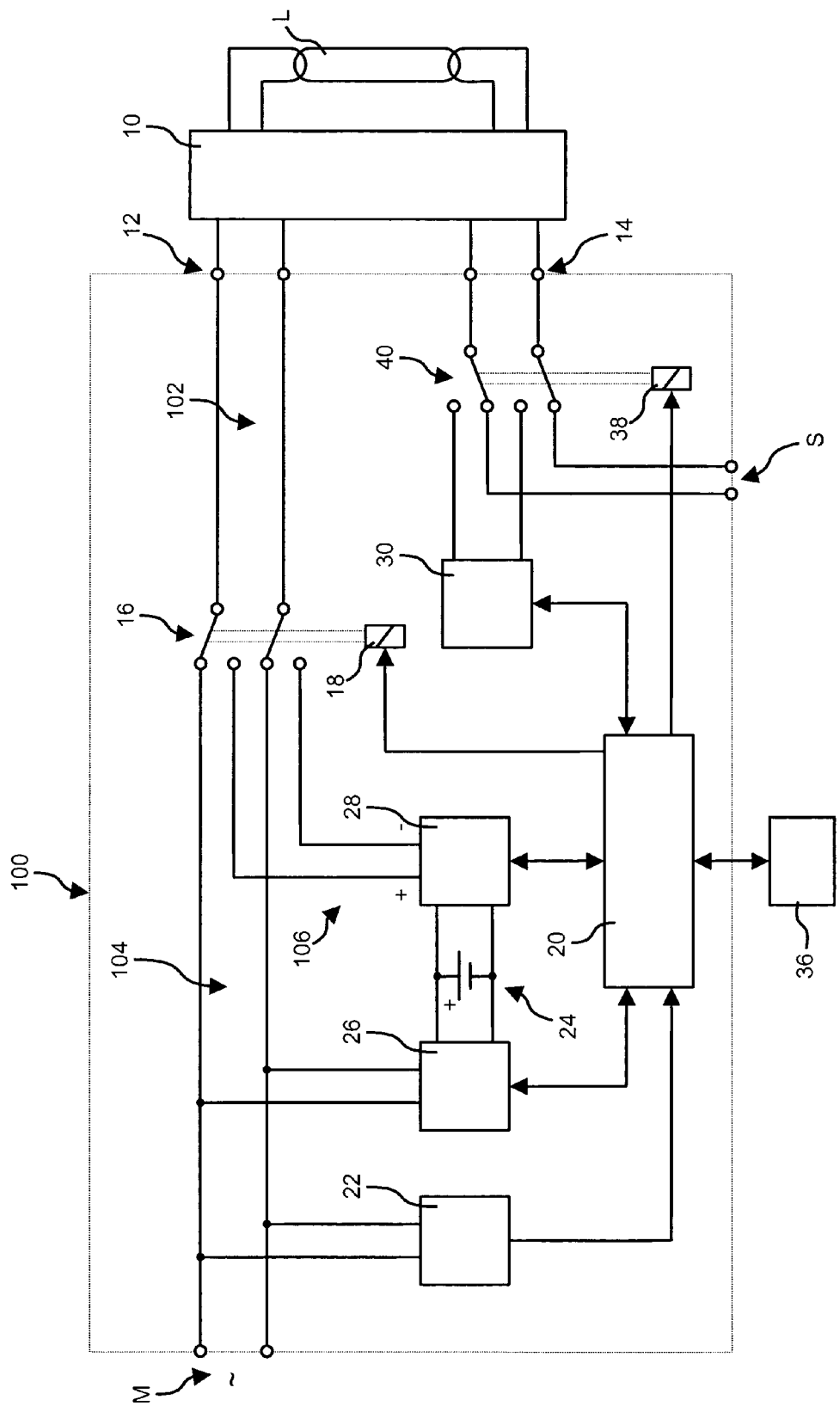

| | | | |
|---|---|---|---|
| GB | 2404474 | A | 2/2005 |
| KR | 10-0643313 | B | 11/2006 |
| KR | 20080087819 | A | 10/2008 |
| WO | 0027013 | A | 5/2000 |

OTHER PUBLICATIONS

English machine translation of DE 20205234 U1, Sep. 18, 2003.

English language abstract of DE 20219737 U1, Mar. 6, 2003.

English abstract of KR 10-0643313 B.

\* cited by examiner

EMERGENCY POWER SUPPLY CIRCUIT FOR DIMMABLE ELECTRONIC BALLASTS AND RELATED METHOD

RELATED APPLICATIONS

The present application is a national stage entry according to 35 U.S.C. §371 of PCT application No.: PCT/IB2008/002824 filed on Oct. 17, 2008.

TECHNICAL FIELD

This disclosure relates to emergency power supply circuits. More specifically, this disclosure relates to emergency power supply circuits for dimmable electronic ballasts feeding e.g. light sources.

BACKGROUND

Certain existing emergency ballasts, e.g. for driving multiple lamps, provide for the electronic ballast to be disconnected from the mains in the case of a mains failure. One of the lamps driven by the electronic ballast is disconnected (e.g. via a relay) from the electronic ballast and coupled to a high-frequency supply source of an emergency ballast. Typically, the lamp is driven in a dimmed condition for reducing power consumption, and the emergency supply continues until the mains feed is re-established or the battery of the emergency ballast is exhausted.

Such an approach works quite well for non-dimmable ballasts but exhibits drawbacks during normal operation of dimmable ballasts and may be the source of complaints and requests for assistance in-the-field.

For example, such arrangements may result in an additional asymmetric capacitive load for a dimmable electronic ballast, which may lead to a non-uniform distribution of currents between the lamps in dimmed operation. In extreme cases, the lamp having coupled thereto the emergency ballasts can also be completely turned-off. Also, wiring errors occur quite often leading to increased field claims.

Increased awareness of energy efficiency in lighting applications is driving the use of dimmable ballasts and lighting control instead of non-dimmable solutions. Therefore an improved emergency ballast is highly favourable which is overcoming the limitations of state of the art designs, if operated with dimming ballasts.

Some prior art solutions try to overcome this problem by providing an emergency power supply circuit which feeds directly the existing electronics ballast in case of a mains failure.

For example, document DE 202 19 737 U1 discloses such an emergency power supply circuit, which however does not provide for dimmed operation.

Document DE 202 05 234 U1 discloses an emergency power supply arrangement relying on a "central" emergency battery, while also providing for dimming operation.

SUMMARY

Analysis of the prior art considered in the foregoing indicates that the need is felt for improved solutions which, i.a.:

avoid additional cabling to the lamp or lamps, thus dispensing with undesirable effects on the distribution of the current over various lamps in a multi-lamp light source, rely on a much simpler cabling arrangement, and provide for more efficient managing of operation in emergency conditions.

Various embodiments provide a response to that need.

The claims form an integral part of the disclosure of the invention as provided herein.

In an embodiment, the arrangement as described herein does not require, on the lamp side, any connection likely to give rise to negative effects during normal operation of a dimmable electronic ballast.

In the place of a high frequency emergency source for feeding the lamps, an embodiment of the arrangement described herein includes an electronic converter to provide feeding of the electronic ballast from an emergency battery.

In an embodiment, the converter is a DC-DC converter, such as a boost converter, which boosts the battery voltage to e.g. about 400 Volt DC.

In an embodiment, dimmed operation is ensured under emergency conditions at a low dimming level, and during normal operation a regular dim interface may be used. For example, embodiments of the arrangement described herein are adapted to include a Digital Addressable Lighting Interface (DALI) e.g. according to the IEC 62386 Standard or a traditional 0.10V analog dimming interface.

In an embodiment, a low frequency AC ripple is added to the DC output to improve EMC (Electro-Magnetic Compatibility) behaviour.

BRIEF DESCRIPTION OF THE ANNEXED REPRESENTATIONS

Figure 2:
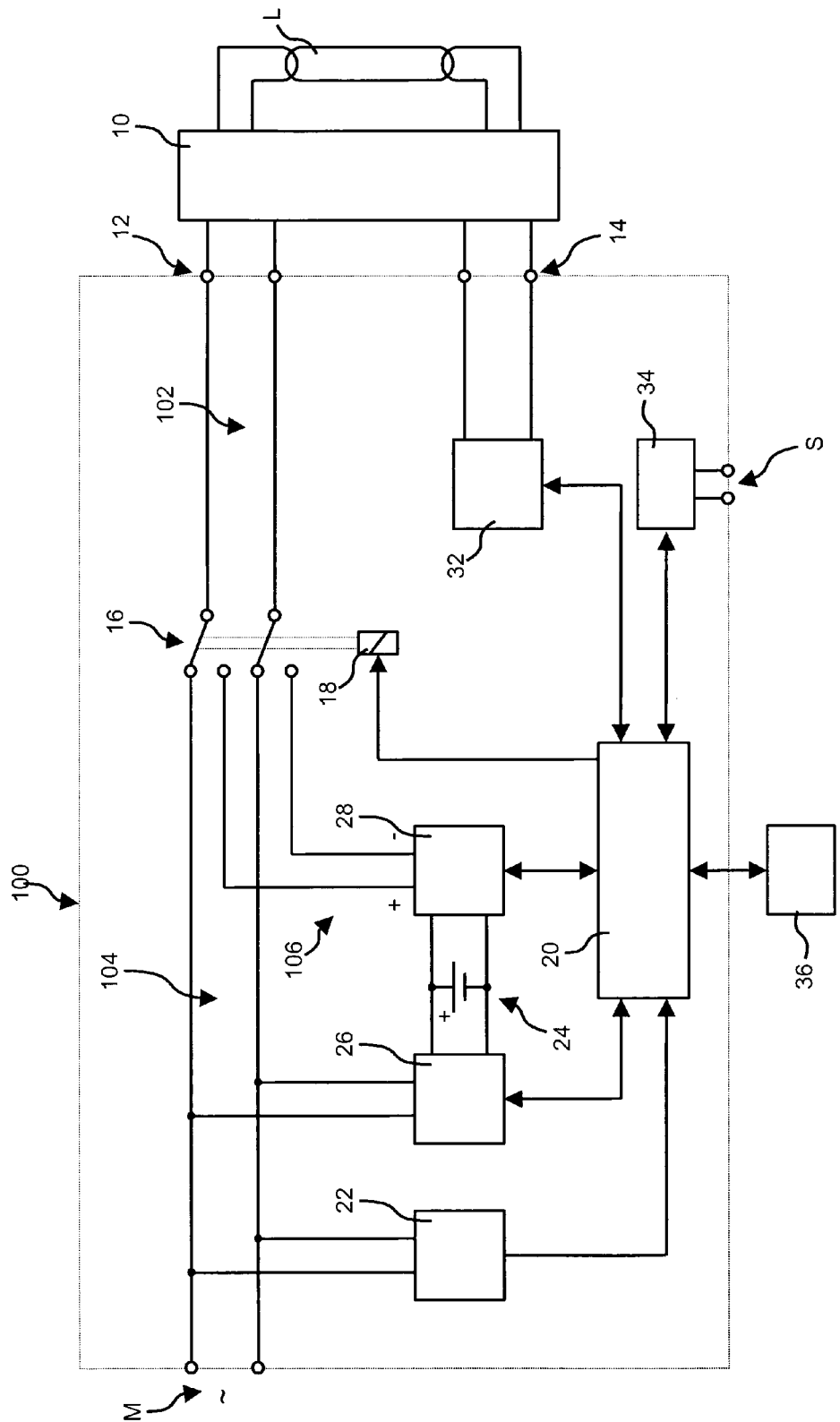

In the drawings, like reference characters generally refer to the same parts throughout the different views, The drawings are not necessarily to scale, emphasis instead generally being placed upon illustrating the principles of the invention. In the following description, various embodiments of the invention are described with reference to the following drawings, in which:

FIG. 1 is a block diagram of a first embodiment of the arrangement described herein, and FIG. 2 is a block diagram of a second embodiment of the arrangement described herein.

DETAILED DESCRIPTION

In the following description, numerous specific details are given to provide a thorough understanding of embodiments. The embodiments can be practiced without one or more of the specific details, or with other methods, components, materials, etc. In other instances, well-known structures, materials, or operations are not shown or described in detail to avoid obscuring aspects of the embodiments.

Reference throughout this specification to "one embodiment" or "an embodiment" means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The headings provided herein are for convenience only and do not interpret the scope or meaning of the embodiments.

The various embodiments described herein will be presented with reference to exemplary circuit layouts, being it understood that parts or elements identical or equivalent will be designated with the same reference symbols throughout the figures.

Also, those of skill in the art will promptly appreciate that the scope of this disclosure is in no way limited to the specific exemplary circuit layout introduced in connection with the figures, but extends to any layout based on the same operating principle.

In both FIGS. 1 and 2, reference 10 denotes a dimmable electronic ballast intended to feed a load comprised of one or more lamps generally designated L.

The electronic ballast 10 includes a supply input 12 as well as a lamp dimming control input 14.

The dimmable electronic ballast 10 may be of any conventional type known in the art. Specifically, FIG. 2 refers to an electronic ballast having a digital control interface, such as a Digital Addressable Lighting Interface (DALI) according to e.g. the IEC 62386 Standard.

The electronic ballast 10 is intended to be supplied:
during normal operation, via a mains supply signal derived from the mains M, and
in emergency conditions (e.g. in the case of a mains failure), via an emergency supply signal drawn from a battery 24.

The battery 24 may be either integrated with the energy power supply circuit 100 to provide a self-contained emergency energy power supply pack, or be attached thereto via an external connector.

The emergency power supply 100 includes an output line 102 to feed the supply input 12 of the electronic ballast as well as first and second feed lines designated 104 and 106, respectively.

A switch 16 controlled via a relay 18 is arranged to selectively connect the output line 102 (and thus the supply input 12 of the electronic ballast 10)
either to the first feed line 104, which is intended to be fed with the mains supply signal derived from the mains M,
or to the second feed line 106, which is intended to be fed with the emergency supply signal derived from the battery 24 via an electronic converter 28.

Generally, the electronic converter 28 may be any DC-DC or DC-AC converter suitable for supplying the electronic ballast 10.

In an embodiment, a switching DC-DC converter is used, such as a boost converter, which boosts the voltage from the battery 24 (typically 12 or 24 Volt) to about 400 Volt DC.

A DC-AC converter may also be used, which converts the voltage from the battery to e.g. 230V/50 Hz or 110V/60 Hz, emulating thus the mains supply signal.

Reference 22 denotes a mains monitor module (of any known type) which monitors the first feed line 104 to detect the presence/absence of the mains supply signal and deliver a corresponding mains status information to a control unit 20 (for instance a microcontroller).

The control unit 20 is connected to the relay 18 to produce switching of the switch 16 in such a way that:
during normal operation i.e. when the mains supplying signal is present on the first feed line 104, the switch 16 connects the first feed line 104 (that is, the mains supplying source M) to the output line 102 and thus to the supply input 12 of the electronic ballast 10;
in emergency conditions i.e. when absence of the mains supply signal is detected by the module 22 (for instance because of a mains failure), the switch 16 connects the output line 102 and thus the supply input of the electronic ballast 10 to the emergency battery 24 via the converter 28.

A battery charger 26 connected to the first feed line 104 ensures that the emergency battery 24 can be re-charged during normal operation (i.e. when the arrangement is fed via the mains signal). In an embodiment, the battery charger circuit 26 also generates an auxiliary low voltage DC supply for powering the control unit 20 and the dimming interface circuits during normal and emergency operation of the battery 24.

The control unit 20 is connected to the battery charger (or, in any case, to the battery 24) to sense the battery status, for instance to control operation of the battery charger 26.

Operation of the converter 28 is controlled by the control unit 20 e.g. to provide on-off operation, to detect possible overload information in case of a defective ballast 10 or, more generally, to provide feedback information on operation of the whole arrangement.

In an embodiment, the converter 28 detects directly overload conditions and deactivates the emergency supply signal. In this case, only a status change may be signalled to the control unit 20.

In the embodiment of FIG. 1, the control unit 20 also controls a further relay 38, which in turn operates a switch 40. The switch 40 is arranged in such a way to connect the dimming control input 14 of the electronic ballast 10 to an outside dimming control line S over which a dimming control signal is provided (in a manner known per se) to control the dimming level of the electronic ballast 10 during normal operation.

In the case of a mains failure (as detected via the module 22) the control unit 20 acts on the relay 38 to cause switching of the switch 40 to a condition where the dimming control input 14 of the electronic ballast 10 is connected to a dimming interface 30. This dimming interface operates under the control of the control unit 20 to ensure the desired dimming level during emergency operation of the electronic ballast 10.

In an embodiment, the dimming interface 30 is an analog dimming interface, such as a 1-10 Volt interface.

In an embodiment, the dimming interface is a bidirectional digital interface, such as a Digital Addressable Lighting Interface (DALI) according to IEC 62386 Standard.

Substantially similar operation is ensured in the embodiment of FIG. 2 via two interfaces designated 32, 34. Specifically, the interface 34 is a bidirectional digital interface according to IEC 62386 standard (DALI). The interface 32 can be of either digital (preferred embodiment) or analog 1.10V type. The interface 34 receives the dimming information for current operation over the line S and conveys that information to the control unit 20 to control via the control input 14 the electronic ballast 10.

Under emergency conditions, the control unit 20 ensures dimmed operation of the electronic ballast 10 (preferably, at a low dimming level, to avoid drawing to much energy from the battery 24).

The embodiment of FIG. 2 preferably provides additional advantages related to the possibility for the emergency power supply 100 to incorporate typical functions of the IEC 62386 (DALI) standard (see for instance IEC 62386, part 202) and incorporates the command extension for emergency lighting as specified in the IEC 62386, part 202 standard.

The two embodiments may also be somehow combined. For example, the electronic ballast 14 may have an analog dimming interface, while the emergency supply provides a DALI compatible interface, wherein the control unit 20 may converts the dimming information. An additional advantage of the embodiment shown in FIG. 2 lies in that the emergency power supply 100 may provide information on the operation of the circuit, such as the mains status, the battery charge status, or a lamp failure, e.g. via the digital interface S.

Finally, reference 36 denotes a user interface module including e.g. a indicator light showing the status of the emergency power supply and a test button to check—e.g. during normal operation—that the emergency power supply is operative and thus ready to take over in case of a mains failure.

The module 36 also possibly allows pre-setting a desired dimming level to be used during emergency operation. In that way, the user may possibly select that energy feeding of the lamps is ensured over a longer/shorter period of time by pre-setting a correspondingly lower/higher dimming level. Also, the availability of information on the battery charge status in the control unit 20 (as provided e.g. via the battery charger 26) may enable the control unit 20 to vary the dimming level during emergency operation (via the interfaces 30 or 32). For instance, the control unit 20 can be configured so that e.g. emergency operation is ensured at first at a given dimming level (in the expectation that mains feed is restored promptly and/or to facilitate rapid evacuation of a building) and then at lower dimming level(s) as the mains failure persists and the load level of the emergency battery 24 gradually decreases.

Without prejudice to the underlying principles of the invention, the details and embodiments may vary, even significantly, with respect to what has been described herein merely by way of example, without departing from the scope of the invention as defined by the annexed claim.

The invention claimed is:

1. An emergency supply circuit for an electronic ballast, wherein said electronic ballast includes a supply input as well as a dimming control input, the circuit comprising:
   an output line to feed said supply input of the electronic ballast;
   a first feed line to receive a mains supply signal;
   a second feed line to receive an emergency supply signal from a battery, with an electronic converter interposed in said second feed line to boost said emergency supply signal,
   a switch to alternatively connect said output line to said first or said second feed line;
   a controller sensitive to the absence of said mains supply signal on said first supply line and to the charge level of said battery, said controller to produce switching of said switch to connect said output line to said second feed line in the absence of said mains supply signal on said first feed line, whereby said output line receives said emergency supply signal boosted by said converter, and
   dimming interface circuitry controlled by said controller to drive said dimming control input of said ballast when said output line is connected to said second feed line;
   wherein said electronic converter is a DC-DC converter; and
   wherein a low frequency AC ripple is added to the DC output of said converter.

2. The circuit of claim 1, wherein said dimming interface circuitry comprises an analog dimming interface.

3. The circuit of claim 1, wherein said dimming interface circuitry comprises a digital dimming interface.

4. The circuit of claim 1, wherein said dimming interface circuitry comprises both an analog dimming interface and a digital dimming interface.

5. The circuit of claim 3, wherein said dimming interface circuitry comprises a digital dimming interface according to the IEC 62386 standard.

6. The circuit of claim 1, wherein said controller is configured to control said dimming interface as a function of the charge status of said battery when said output line is connected to said second feed line.

7. The circuit of claim 1, wherein said electronic converter is a boost converter.

8. The circuit of claim 1, wherein said electronic converter is configured to sense fault conditions of said ballast and to provide feedback to said controller.

9. The circuit of claim 8, wherein said controller is configured to shut down said electronic converter if a fault condition is sensed.

10. The circuit of claim 1, wherein said controller has associated at least one of a user interface module and an interface to provide feedback information in case of failure of said ballast.

11. The circuit of claim 1, wherein the circuit comprises a user interface module for checking operation of said circuit.

12. The circuit of claim 1, wherein the circuit comprises a user interface module to selectively pre-set at least one desired dimming level for said controller to control said dimming interface when said output line is connected to said second feed line.

13. The circuit of claim 1, wherein said circuit further comprises a battery charger for charging said battery.

14. The circuit of claim 1, having said battery integrated therewith to provide a self-contained emergency energy power supply pack.

15. A method of providing emergency supply to an electronic ballast including a supply input as well as a dimming control input, the method comprising:
    providing a first feed line to receive a mains supply signal;
    providing a second feed line to receive an emergency supply signal from a battery said second feed line having a DC-DC electronic converter interposed therein to boost said emergency supply signal,
    sensing the absence of said mains supply signal on said first supply line and the charge level of said battery,
    adding a low frequency AC ripple to the DC output of said converter; and in the absence of said mains supply signal on said first feed line:
    connecting said supply input of said ballast to said second feed line whereby said supply input of said ballast receives said emergency supply signal boosted by said electronic converter, and
    controllably driving said dimming control input of said ballast.

16. An emergency supply circuit for an electronic ballast, wherein said electronic ballast includes a supply input as well as a dimming control input, the circuit comprising:
    an output line to feed said supply input of the electronic ballast;
    a first feed line to receive a mains supply signal;
    a second feed line to receive an emergency supply signal from a battery, with an electronic converter interposed in said second feed line to boost said emergency supply signal,
    a switch to alternatively connect said output line to said first or said second feed line;
    a controller sensitive to the absence of said mains supply signal on said first supply line and to the charge level of said battery, said controller to produce switching of said switch to connect said output line to said second feed line in the absence of said mains supply signal on said first feed line, whereby said output line receives said emergency supply signal boosted by said converter, and dimming interface circuitry controlled by said controller to drive said dimming control input of said ballast when said output line is connected to said second feed line, wherein said electronic converter is configured to sense fault conditions of said ballast and to provide feedback to said controller.

\* \* \* \* \*